(12) United States Patent
Augé et al.

(10) Patent No.: US 12,341,702 B2
(45) Date of Patent: Jun. 24, 2025

(54) PACKET FLOW IDENTIFICATION AND QoE-AWARE PROCESSING USING A LOCAL DEVICE AGENT

(71) Applicant: Cisco Technology, Inc., San Jose, CA (US)

(72) Inventors: Jordan François Jean Augé, Saint-Cyr-I-Ecole (FR); Jacques Olivier Samain, Paris (FR); Mauro Sardara, Issy-les-Moulineaux (FR)

(73) Assignee: Cisco Technology, Inc., San Jose, CA (US)

( * ) Notice: Subject to any disclaimer, the term of this patent is extended or adjusted under 35 U.S.C. 154(b) by 657 days.

(21) Appl. No.: 17/667,662

(22) Filed: Feb. 9, 2022

(65) Prior Publication Data

US 2023/0254254 A1 Aug. 10, 2023

(51) Int. Cl.
*H04L 47/24* (2022.01)
(52) U.S. Cl.
CPC .................................. *H04L 47/24* (2013.01)
(58) Field of Classification Search
CPC ...... H04L 47/24; H04L 47/2441; H04L 45/38
See application file for complete search history.

(56) References Cited

U.S. PATENT DOCUMENTS

| 6,651,101 | B1 | 11/2003 | Gai et al. |
| 9,686,127 | B2 | 6/2017 | Ramachandran et al. |
| 10,257,082 | B2 | 4/2019 | Hughes |
| 2012/0284403 | A1* | 11/2012 | Bansal ................... H04L 69/326 709/224 |
| 2016/0014033 | A1* | 1/2016 | Dosovitsky ............. H04L 47/20 370/235 |
| 2016/0080502 | A1* | 3/2016 | Yadav ................... H04L 45/125 709/227 |
| 2017/0078451 | A1* | 3/2017 | Wills ................... H04L 47/2441 |
| 2018/0227223 | A1* | 8/2018 | Hughes ................... H04L 69/22 |
| 2018/0331946 | A1* | 11/2018 | Olofsson ................ H04L 45/22 |
| 2020/0044955 | A1* | 2/2020 | Pugaczewski ...... H04L 41/5025 |
| 2020/0322183 | A1* | 10/2020 | Lin ......................... H04L 45/28 |

(Continued)

FOREIGN PATENT DOCUMENTS

| CN | 103609071 A | 4/2017 | |
| EP | 1351445 A1 * | 10/2003 | ............. H04L 29/06 |

(Continued)

*Primary Examiner* — Chi H Pham
*Assistant Examiner* — Vladislav Y Agureyev
(74) *Attorney, Agent, or Firm* — BEHMKE INNOVATION GROUP LLC; James M. Behmke

(57) ABSTRACT

In one embodiment, an agent executed by a device maps a packet flow of the device with a session of an application executed by the device based on execution information about the application that is captured by an operating system of the device. The agent determines, based in part on mapping the packet flow of the device with the session of the application, one or more adjustments for a packet of the packet flow according to an application profile. The agent forms an adjusted packet by applying the one or more adjustments to a packet of the packet flow, wherein the one or more adjustments indicate to a networking device how packets of the packet flow should be processed. The agent sends the adjusted packet as part of the packet flow to an external destination via a network.

20 Claims, 7 Drawing Sheets

(56) References Cited

U.S. PATENT DOCUMENTS

| | | | |
|---|---|---|---|
| 2021/0306912 A1* | 9/2021 | Stojanovski | H04W 76/10 |
| 2021/0399989 A1* | 12/2021 | Wang | H04L 47/2491 |
| 2022/0124043 A1* | 4/2022 | Zhu | H04L 47/2475 |
| 2023/0208769 A1* | 6/2023 | Iyer | H04L 45/64 |
| | | | 370/230 |
| 2023/0217298 A1* | 7/2023 | Chae | H04L 47/2441 |
| | | | 370/328 |
| 2023/0231811 A1* | 7/2023 | Dalal | G06F 13/1605 |
| | | | 710/308 |

FOREIGN PATENT DOCUMENTS

| | | | | |
|---|---|---|---|---|
| KR | 20110066072 A | 6/2014 | | |
| WO | WO-2006073804 A2 * | 7/2006 | | H04L 45/38 |

* cited by examiner

PACKET FLOW IDENTIFICATION AND QoE-AWARE PROCESSING USING A LOCAL DEVICE AGENT

TECHNICAL FIELD

The present disclosure relates generally to computer networks, and, more particularly, to packet flow identification and Quality of Experience (QoE)-aware processing using a local device agent.

BACKGROUND

Generally, a given device (e.g., cellphone, tablet, laptop, etc.) may send out a plurality of packet flows from a plurality of different applications that execute on the device, rendering it challenging to identify or match a particular flow to a particular application. On top of this, applications are not oftentimes not configured to detail how the plurality of packet flows from a given application is to be treated in a communication network. Even more, a given application may provide a plurality of functions, features, etc. that each may require varying level of prioritization, treatment, etc. Quality of Service (QoS) treatment of the flows, like that provided using differentiated services code point (DSCP) marking, might not directly correlate to an increase in general quality expectations for an application (i.e., Quality of Experience (QoE)) that has its traffic marked with DSCP.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
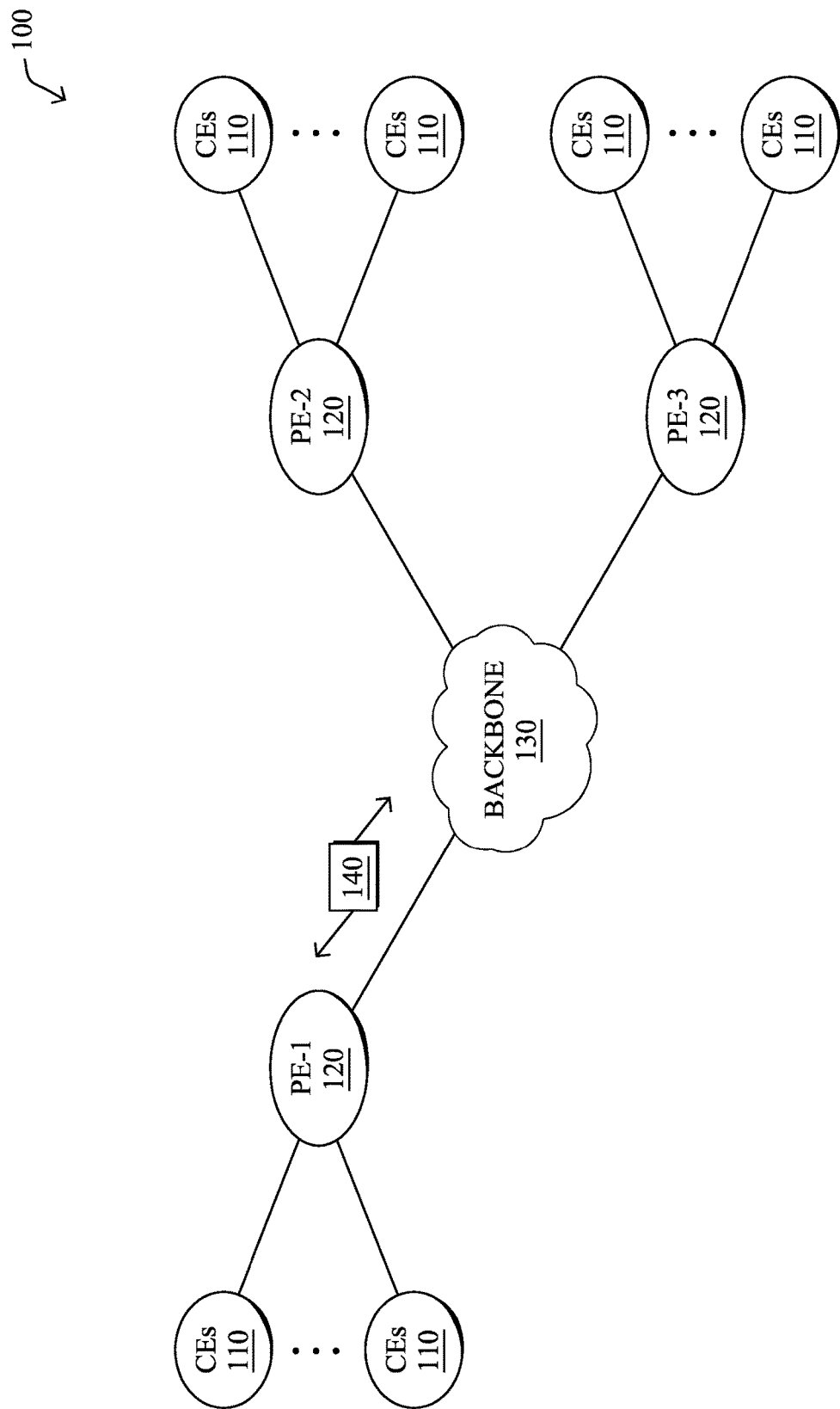
FIGS. 1A-1B illustrate an example communication network.

According to one or more embodiments of the disclosure, an agent executed by a device maps a packet flow of the device with a session of an application executed by the device based on execution information about the application that is captured by an operating system of the device. The agent determines, based in part on mapping the packet flow of the device with the session of the application, one or more adjustments for a packet of the packet flow according to an application profile. The agent forms an adjusted packet by applying the one or more adjustments to a packet of the packet flow, wherein the one or more adjustments indicate to a networking device how packets of the packet flow should be processed. The agent sends the adjusted packet as part of the packet flow to an external destination via a network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
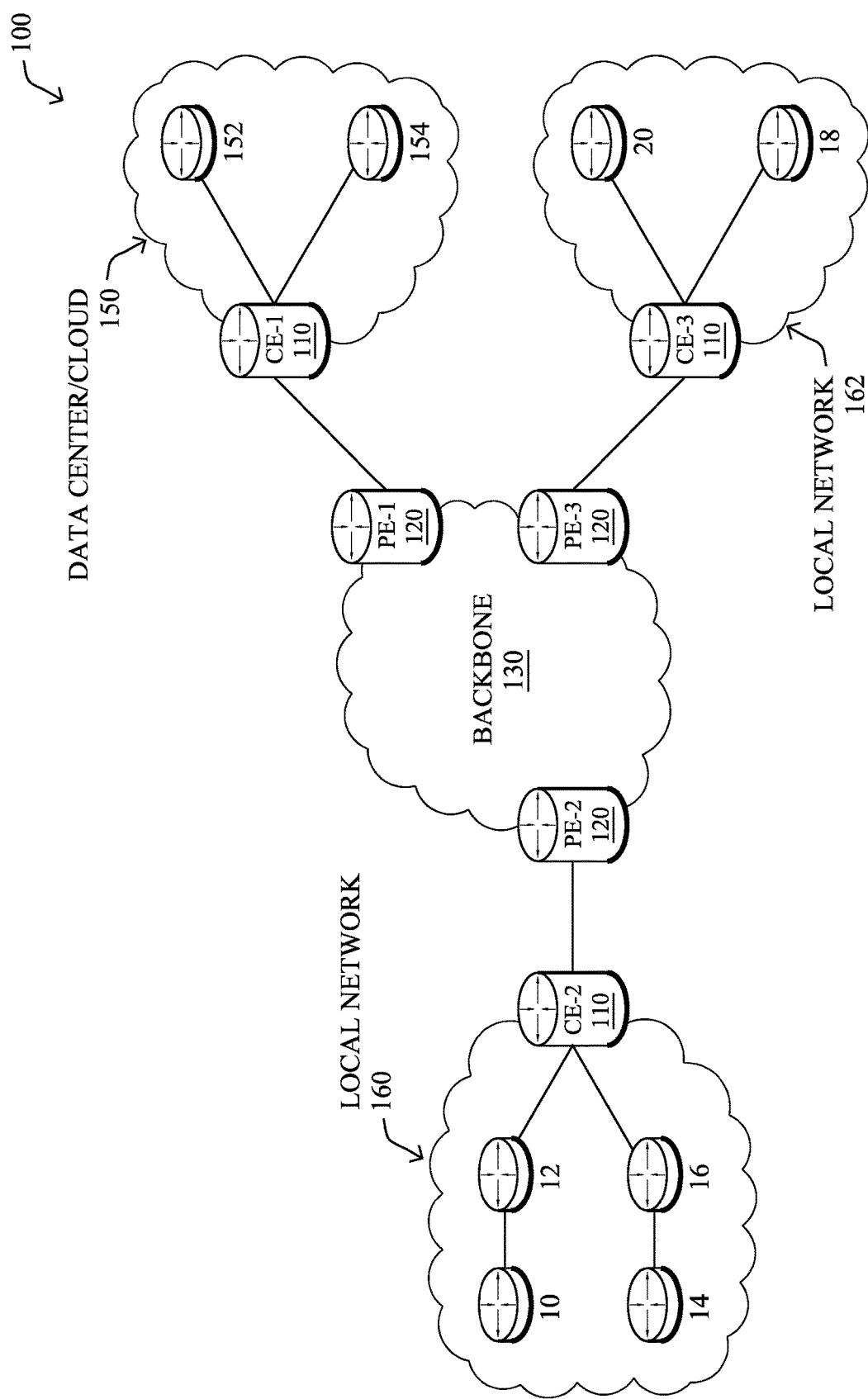

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
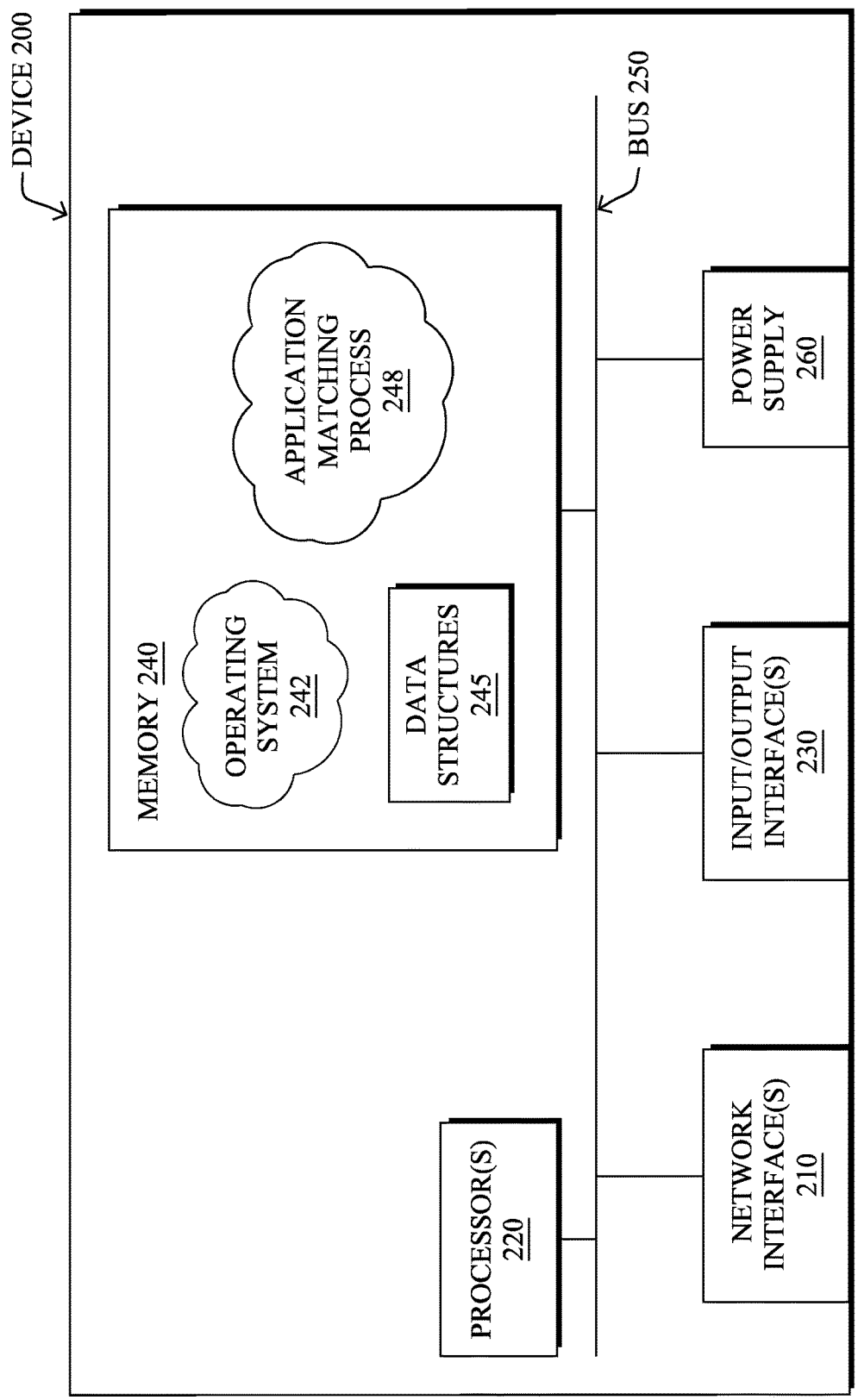
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise application matching process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, application matching process 248 may utilize machine learning techniques, to perform application identification in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of application identification in a network, a learning machine may construct a model of normal network behavior, to detect data points that deviate from this model. For example, a given model (e.g., a supervised, un-supervised, or semi-supervised model) may be used to generate and report application identification scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of application identification is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of confidence in an application's ascertained identity is (e.g., using a Euclidian distance and a cluster based local outlier factor that takes into account the cluster density).

Replicator techniques may also be used for purposes of application identification. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

As noted above, a given endpoint device (e.g., cellphone, tablet, laptop, etc.) may send out a plurality of packet flows, which may from time to time be referred as network flows, from a plurality of different applications that execute on the endpoint device, rendering it challenging to identify or match a particular flow to a particular application. On top of this, from the perspective of an endpoint device, a given application executing on the endpoint is generally not configured to detail how one or more network flows (e.g., communication traffic) from the application is to be treated in a communication network (e.g., from the endpoint device, through a plurality of local networks, the Internet, etc., all the way to the one or more network flows ultimate destination). For example, a videoconferencing application may be configured to merely communicate videoconference data using an endpoint device's operating system level communications software and/or hardware, without the ability to express one or more detailed flow treatment policies for videoconference data. Even more, a given application may provide a plurality of functions, features, etc. that each may require varying level of prioritization, treatment, etc. In the case of a videoconferencing application, it may communicate both text-based messaging data that may not require a high level of service as well as audio/video data that does.

Various solutions exist that may aid in determining which application (of an endpoint device) a network flow originates from. However, in practice, these solutions are limited. For example, using a socket owner to match a network flow to an application is impractical in that a socket may be shared or moved among processes (which is made even more complicated by browser applications that comprise a plurality of applications and associated flows with various requirements). On the other hand, matching of a network flow to an application based on conventional network information (e.g., domain name system (DNS) flow classification, network information gathered by deep packet inspection (DPI), etc.), may be resource intensive and hindered by mechanisms such as encryption.

Packet Flow Identification and QoE-Aware
Processing Using a Local Device Agent

The techniques herein introduce mechanisms for packet flow identification and QoE-aware processing using a local device agent. A local agent of the techniques described herein may be executed by a device, along with or as part of an application, so as to provide optimal guarantees for network flows, traffic, etc. at an application-level, or even subcomponent-level of the application (e.g., different browser tabs of a web browser application). Providing guarantees for the network flows may be based on one or more profiles (that may be stored a cloud computing environment and defined, in part, by stakeholders of the application). Notably, by combining and analyzing system information and network information, Quality of Experience (QoE) improvements to ici various flows of a particular application executed on the device are provided (e.g., flows that need to be treated with high priority versus flows that do not).

Notably, system information may be gathered by the local agent at an operating system level of the device, where the system information includes, for example, information regarding process groups, processes, threads, socket membership, etc. Network information, which the local agent also gathers, may include information such as domain name system (DNS) information, internet protocol (IP) addresses, transport layer security server name indications (TLS SNIs), etc. Based on this information, the local agent may match a particular flow to a flow profile associated with the application, where the flow profile includes QoE adjustments for the flow. Such adjustments may include reactive punting, traffic proxying, etc. of a particular network flow based on QoE improvement expectations (e.g., real-time flows).

Illustratively, the techniques described herein may be performed by hardware, software, and/or firmware, such as in accordance with application matching process 248, which may include computer executable instructions executed by the processor 220 (or independent processor of interfaces 210) to perform functions relating to the techniques described herein.

Specifically, according to various embodiments, an agent executed by a device maps a packet flow of the device with a session of an application executed by the device based on execution information about the application that is captured by an operating system of the device. The agent determines, based in part on mapping the packet flow of the device with the session of the application, one or more adjustments for a packet of the packet flow according to an application profile. The agent forms an adjusted packet by applying the one or more adjustments to a packet of the packet flow, wherein the one or more adjustments indicate to a networking device how packets of the packet flow should be processed. The agent sends the adjusted packet as part of the packet flow to an external destination via a network.

Figure 3:
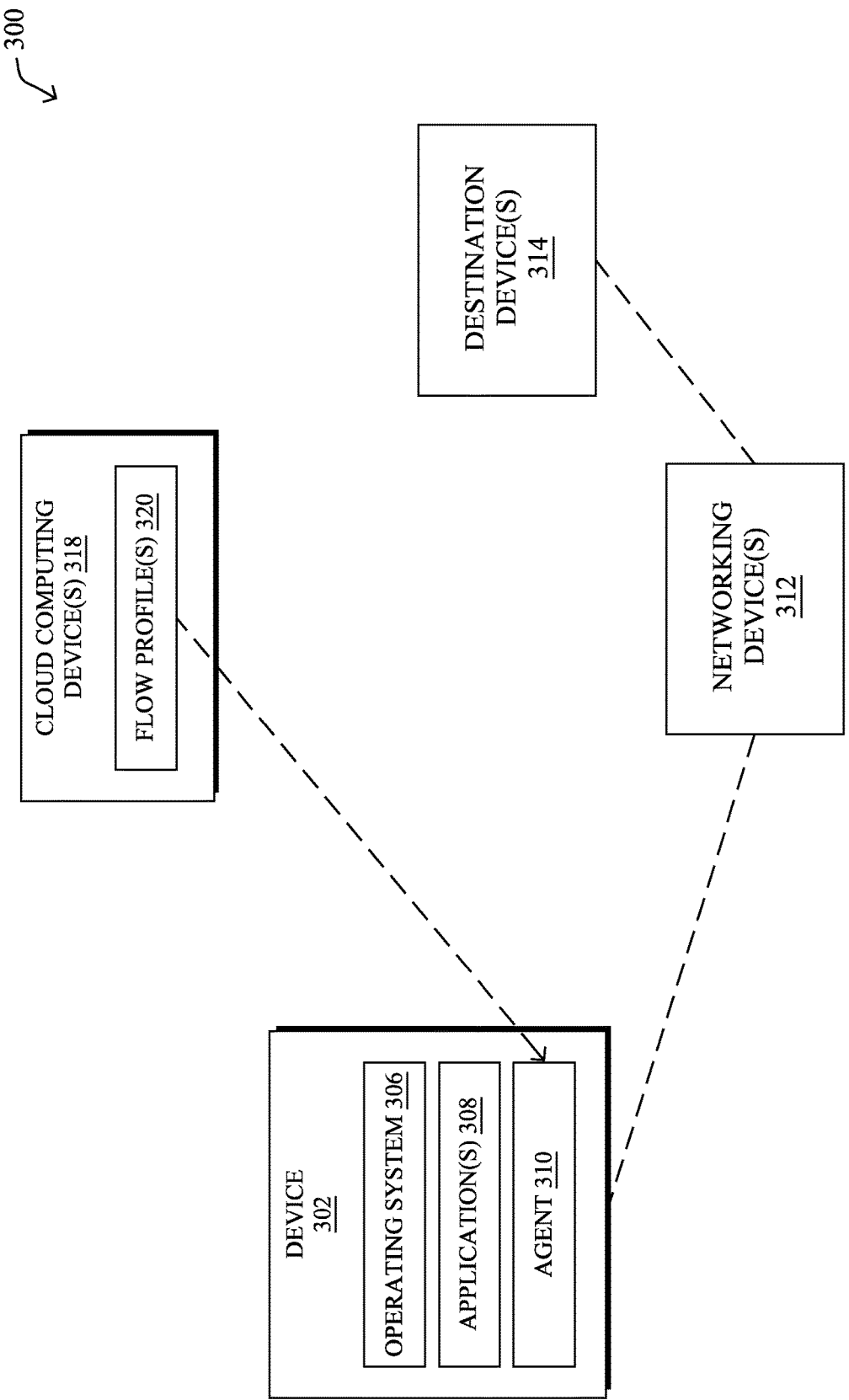
FIG. 3 illustrates an example architecture for packet flow identification and QoE-aware processing using a local device agent.

Operationally, FIG. 3 illustrates an example architecture for packet flow identification and QoE-aware processing using a local device agent, where architecture 300 may include an endpoint device 302 and a destination device 304. Endpoint device 302 may comprise any end user computing device which a user may use to communicate with destination device 304, for example, a cellphone, tablet, laptop, cellphone, etc. Endpoint device 302, as shown, may comprise operating system 306, application(s) 308, and agent 310 that is local to endpoint device 302. Of note, operating system 306 may be configured as described above with respect to operating system 242 of FIG. 2, where operating system 306 may manage network communications, input/output, etc. of endpoint device 302. Application(s) 308 of endpoint device 302 may comprise applications that may be executed on endpoint device 302 (along with operating system 306), for example, a videoconference application, a multimedia application, a gaming application, etc. that communicate one or more network flows which travel over paths comprising networking device(s) 312 to destination device (s) 314. It is to be understood that each of these applications may send out various network flows that each require varying degrees of prioritization, treatment, etc. Generally, destination device(s) 314 may comprise computing resources, data storage, etc. that application(s) 308 may access or use during execution. Furthermore, in an embodiment, it is contemplated that application(s) 308 may comprise a native application to the endpoint device 302 that communicates with a networking stack (e.g., of operating system 306). In this embodiment, the native application may be configured itself to operate as agent 310.

In addition, architecture 300 comprises cloud computing device(s) 316 that, as shown in FIG. 3, is configured to store one or more flow profiles 320 that may be defined and specified by end users, managers/stakeholders, etc. of application(s) 308. One or more flow profiles 320 may be unique to a particular application and include one or more flow treatment policies for network flow, traffic, packets, etc. generated (or caused to be generated) by the application that reflect various QoE enhancements desired for a given function of the application. A particular profile for an application may define how various network traffic output by the application is to be treated. For instance, a profile for a gaming application may require that data related to a user's gaming experience is prioritized for as soon as possible delivery service, while data related to chat/text messages is de-prioritized. Agent 310 is configured to retrieve profile mappings of one or more flow profiles 320 subsequent to the profiles being defined. Furthermore, it is contemplated that the functions provided by agent 310, in some embodiments, may be performed off-site from device 302, for example, at cloud computing device(s) device(s) 316.

Figure 4:
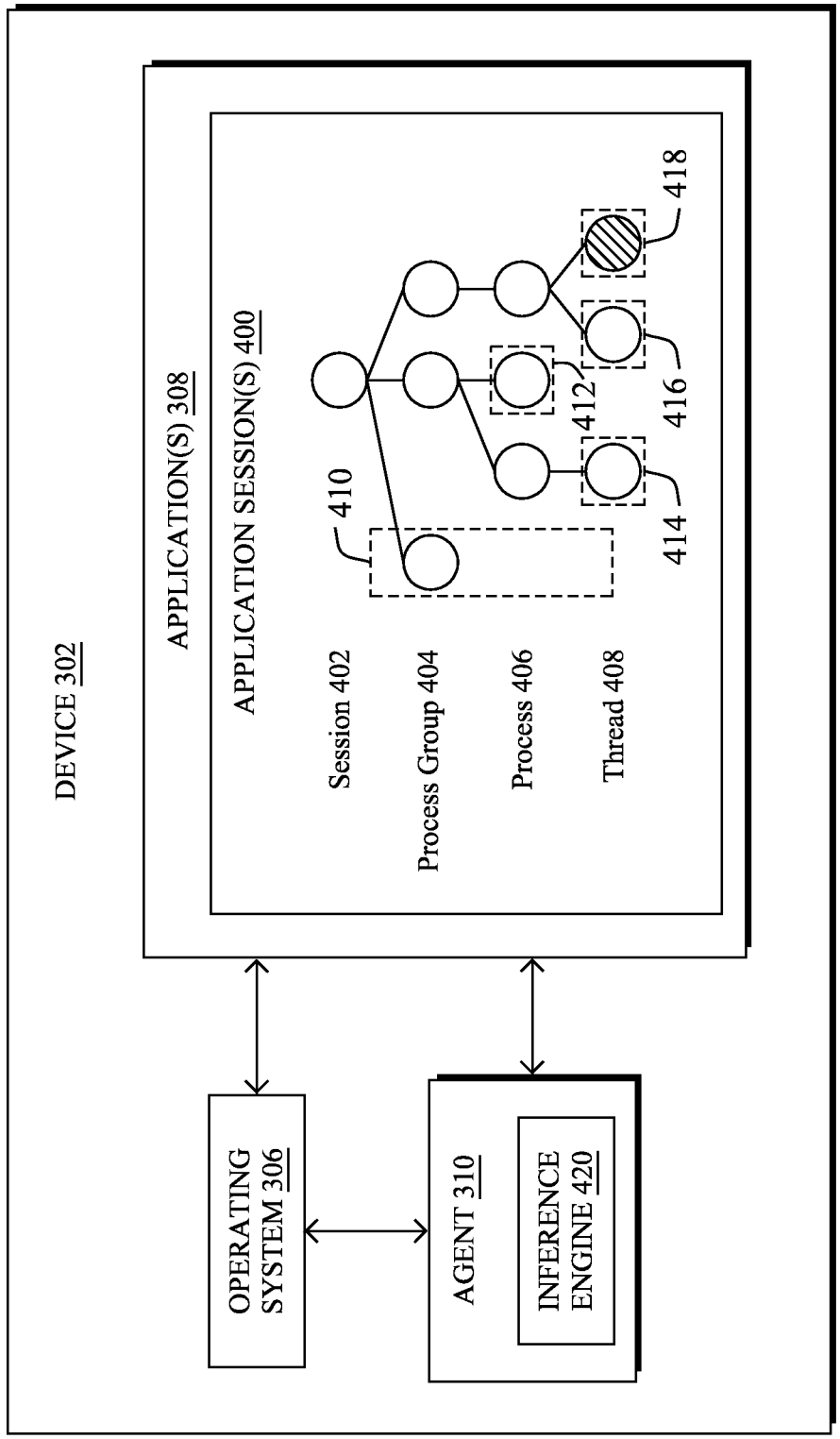
FIG. 4 illustrates an example device executing a local device agent.

Turning to FIG. 4, additional details regarding an example device executing a local device agent is shown. In particular, out of application(s) 308 that device 302 may be executing, it may have a plurality of application sessions 400 executing on device 302 that are managed by operating system 306. As is understood in the art, application sessions 400 may comprise functional computing components used to perform a variety of tasks that are associated with application(s) 308, where the tasks may be organized in or understood as "tiers" comprising session 402, process group 404, process 406, and threads 408. As shown, a particular application, for example a web browser application, may have process group 410, process 412, a first thread 414, a second thread 416, and a third thread 418 associated with it, where each may be associated with a particular function, task, etc. of the web browser application (e.g., a tab of the browser, a networking/computing feature, etc.).

The organization as well as information regarding process group 410, process 412, a first thread 414, a second thread 416, and a third thread 418 for the web browser application may discovered by agent 310. Agent 310 may also discover computing resources (of device 302) that are used for each of the application sessions (e.g., sockets that may be used for purposes of network communications). More particularly, this may be understood as execution information (or system information) that is indicative of information about an application that has generated a particular packet (or network flow) flow, including a name of the application, an eventual process group identifier and/or session identifier, more granular information (e.g., thread identifier), etc. This information is conventionally available at an operating system level of device 302, which agent 310 is configured to have at least partial access to by way of methods known in the art. In addition, agent 310 may further obtain network information about one or more flows (e.g., through traffic inspection). Such network information may be gathered by analysis of network protocol headers, for, such as DNS (to obtain mappings between descriptive names and IP addresses), TLS (to obtain SNI), or even session description (SDP) exchanges in the context of real-time communications.

Agent 310 that is local to application(s) 308 may, based on the execution information, network information, and a given flow profile for an application, deduce on a per-packet (that may be intercepted) basis a particular application and its flow quality requirements. Stated another way, as opposed to conventional technologies that use network information to infer an identity of an application or application case, agent 310 is configured to match a particular application and flow type to a given packet flow (from device 302 to another device). Agent 310 may be configured to group a particular flow associated with an application based on available execution or system information (e.g., process groups, processes, threads, and socket membership) as well as infer that the particular flow belongs to the same application. Further, based on a particular flow profile for the application, agent 310 may determine one or more adjustments for identified flow, where the adjustments reflect a plurality of QoE enhancements for the flow.

As examples, agent 310 may match an intercepted packet to a web browser application since it may comprise information indicating that it is from a same thread. In another example, agent 310 may determine that a packet is from a packet flow for control traffic since the packet is created subsequent a network flow comprising video data. Altogether, it is contemplated that particular types of network flows that agent 310 may identify include real-time audio data/flows, streaming data/flows, control/command data/flows, etc. It is contemplated that agent 310 may comprise an inference engine 420 that is configured to leverage machine learning techniques, as described herein above, to match a given packet flow to an application executing on device 302.

Figure 5:
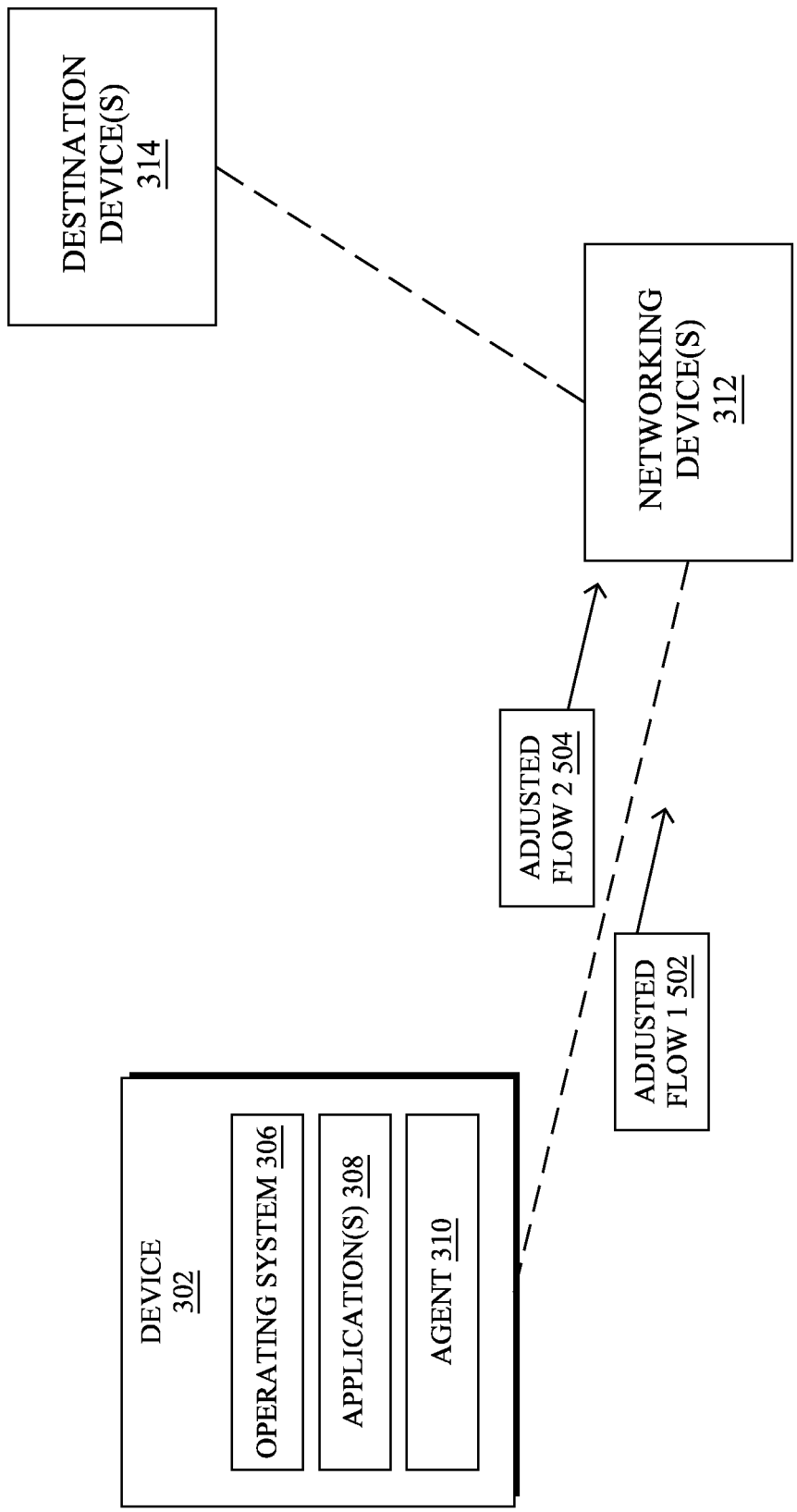
FIG. 5 illustrates additional details regarding an example architecture for packet flow identification and QoE-aware processing using a local device agent.

With reference now to FIG. 5, additional details regarding the example architecture for packet flow identification and QoE-aware processing using a local device agent are shown. In particular, subsequent to agent 310 determining one or more adjustments to be applied to an identified flow, agent 310 may apply one or more adjustments for a packet flow associated with an application, leading to differential treatment to application flows or sub-flows according to one or more flow profiles 320. The adjustments may include configuring various aspects of flow treatment, such as the transport protocol parameters (e.g., selection of a network transport layer transmission protocol for the packet, for example, user datagram protocol (UDP) or transmission control protocol (TCP)), active queue management (AQM) application and scheduling, packet forwarding strategy, network interface selection (wired LAN, Wi-Fi, Bluetooth, cellular data, etc.), etc.

In the example shown in FIG. 5, agent 310 may have determined that a first adjusted flow 502 has originated from a browser application of device 302 and is an AP session (e.g., without isolation and one tab of the browser application associated with one thread). According to one or more flow profiles 320, agent 310 may determine that first adjusted flow 502 should be configured to be treated as a proxy-based forwarding path in a direction toward destination device(s) 314. After adjustments are made to first adjusted flow 502, the adjustments cause device(s) 312 to treat the flow accordingly. More specifically, agent 310 may be configured to perform reactive punting of flow traffic (e.g., following a DNS query to a given pattern), as opposed to pre-established punting. Doing so diverts a particular flow from its original processing, where such diversion is expected to provide QoE enhancements for a particular type of flow (e.g., a real-time flow). For example, this may be done by establishing a forwarding pipeline according to a flow profile and by causing the pipeline to be treated by networking device(s) 312 in a particular manner according to parameters of first adjusted flow 502 (e.g., transport over Hybrid Information-Centric Networking (hICN), select transport protocol, configured parameters, applied DSCP markings, etc.).

Agent 310 may have determined that a second adjusted flow 504 has been matched to another application that is being executed on endpoint device 302 and that it is a real-time flow, leading to agent 310 determining that second adjusted flow 504 is to be "punted" or sent along a regular forwarding path according to one or more flow profiles 320. Accordingly, 310 may apply adjustments second adjusted flow 504 such that it is forwarded and treated by device(s) 312 accordingly in the direction toward destination device(s) 314.

Figure 6:
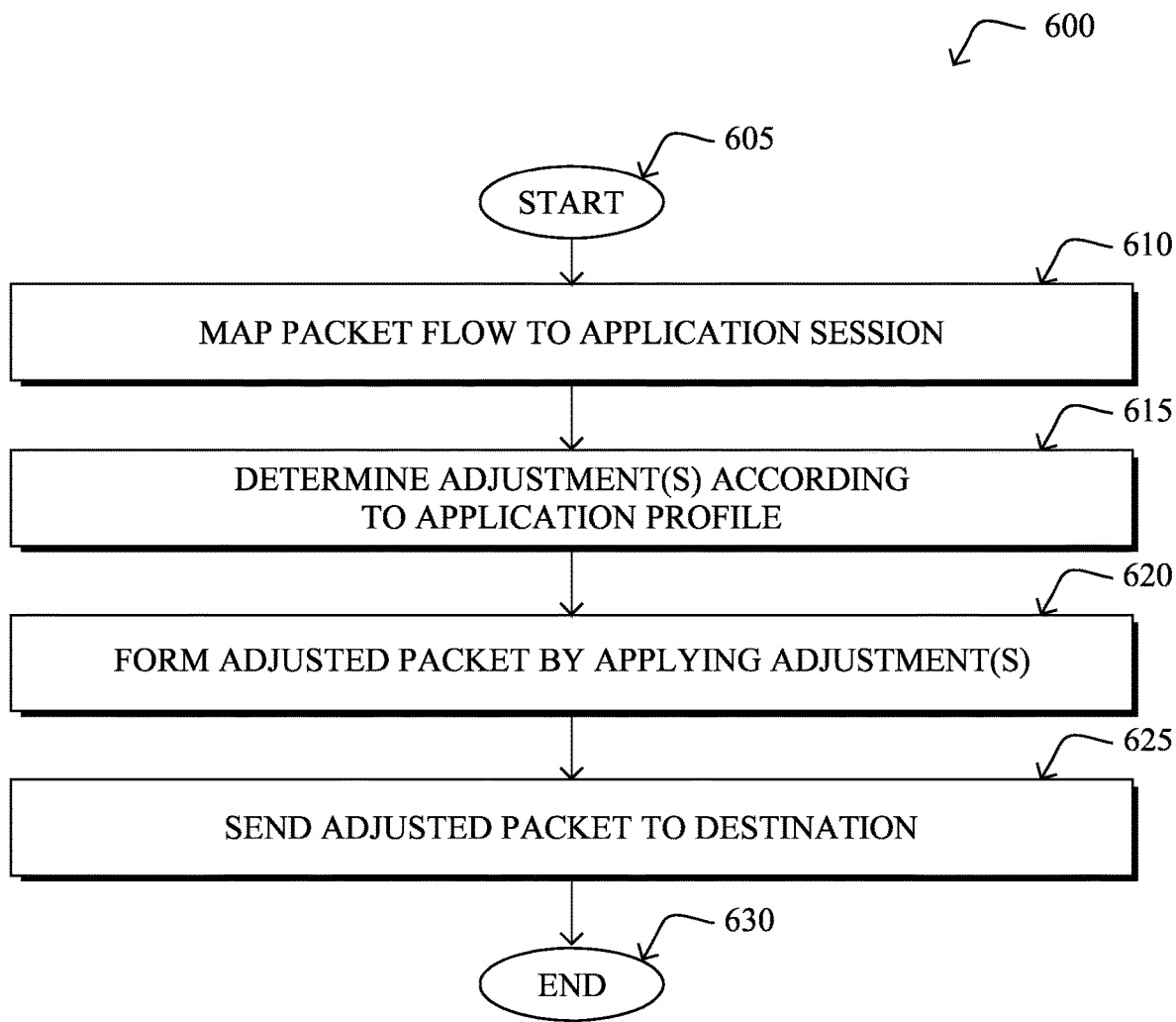
FIG. 6 illustrates an example simplified procedure for packet flow identification and QoE-aware processing using a local device agent.

FIG. 6 illustrates an example simplified procedure (e.g., a method) for packet flow identification and QoE-aware processing using a local device agent, in accordance with one or more embodiments described herein. For example, a non-generic, specifically configured device (e.g., device 200), may perform procedure 600 by executing stored instructions (e.g., application matching process 248). The procedure 600 may start at step 605, and continues to step 610, where, as described in greater detail above, an agent executed by a device may map a packet flow of the device with a session of an application executed by the device based on execution information about the application that is captured by an operating system of the device. In an embodiment, the execution information about the application may comprise information indicative of process groups, processes, threads, and socket membership associated with the application. In another embodiment, mapping the packet flow of the device with the session of the application executed by the device may be further based on network information associated with the device. In a further embodiment, the network information may comprise domain name system information, mappings between descriptive names and IP addresses, server name indications, or session description exchanges. In yet another embodiment, mapping the packet flow of the device with the session of the application executed by the device may comprise applying, by the agent, an inference engine to the execution information.

At step 615, as detailed above, the agent may determine, based in part on mapping the packet flow of the device with the session of the application, one or more adjustments for a packet of the packet flow according to an application profile. In an embodiment, the one or more adjustments for the packet of the packet flow according to the application profile may cause the packets of the packet flow to be sent along a proxy forwarding path. In another embodiment, the one or more adjustments for the packet of the packet flow according to the application profile cause the packets of the packet flow to be punted along a network path. In a particular embodiment, the one or more adjustments to the packet may comprise selecting network transport layer protocol for the packet (e.g., UDP or TCP). In yet another embodiment, the one or more adjustments for the packet of the packet flow according to the application profile comprise determining active queue management (AQM) scheduling for the packets of the packet flow. In a further embodiment, the one or more adjustments for the packet of the packet flow according to the application profile comprise determining a packet forwarding strategy for the packets of the packet flow.

At step 620, the agent may form an adjusted packet by applying the one or more adjustments to a packet of the packet flow, wherein the one or more adjustments indicate to a networking device how packets of the packet flow should be processed. That is, the agent may form the adjusted packet according to the one or more embodiments, for example, by configuring the adjusted packet to be transmitted by a particular network interface of the device, using a selected network transport layer protocol for the packet etc. In an embodiment, the packet flow may comprise a real-time audio flow, streaming flow, or control/command flows.

At step 625, as detailed above, the agent may send the adjusted packet to an external destination via a network. Notably, the agent may communicate the adjusted packet according to the one or more adjustments as well as cause the adjusted packet to be sent "upstream" from the device along a path towards a destination for traffic of the application. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for network flow differentiation using a local agent of a device. That is, the local agent may be executed along with or as part of an application of the device, so as to provide optimal guarantees for network flows, traffic, etc. of the application based on one or more profiles. In order to bring Quality of Experience (QoE) improvements to various flows of a particular application executed on a device (e.g., flows that need to be treated with high priority versus flows that do not), a local agent may be deployed. Based on execution information and network information, the local agent may match a particular flow to a flow profile associated with the application, where the flow profile includes QoE adjustments for the flow. Such adjustments may include reactive punting, traffic proxying, etc. of a particular network flow based on QoE improvement expectations (e.g., real-time flows).

While there have been shown and described illustrative embodiments that provide network flow differentiation using a local agent, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of network packets, protocols, etc. are discussed herein, the techniques herein may be used in conjunction with any network packets, protocols, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    mapping, by an agent executed by a device, a packet flow of the device with a session of an application executed by the device based on execution information about the application that is captured by an operating system of the device, wherein the execution information is indicative of computing resources used by the application;
    determining, by the agent and based in part on mapping the packet flow of the device with the session of the application, one or more adjustments for a packet of the packet flow according to an application profile;
    forming, by the agent, an adjusted packet by applying the one or more adjustments to a packet of the packet flow, wherein the one or more adjustments indicate to a networking device how packets of the packet flow should be processed; and
    sending, by the agent, the adjusted packet as part of the packet flow to an external destination via a network.

2. The method as in claim 1, wherein the execution information about the application comprises information indicative of process groups, processes, threads, and socket membership associated with the application.

3. The method as in claim 1, wherein mapping the packet flow of the device with the session of the application executed by the device is further based on network information associated with the device.

4. The method as in claim 3, wherein the network information comprises domain name system information, mappings between descriptive names and IP addresses, server name indications, or session description exchanges.

5. The method as in claim 1, wherein mapping the packet flow of the device with the session of the application executed by the device comprises:
    applying, by the agent, an inference engine to the execution information.

6. The method as in claim 1, wherein the one or more adjustments for the packet of the packet flow according to the application profile cause the packets of the packet flow to be sent along a proxy forwarding path.

7. The method as in claim 1, wherein the one or more adjustments for the packet of the packet flow according to the application profile cause the packets of the packet flow to be punted along a network path.

8. The method as in claim 1, wherein the one or more adjustments for the packet of the packet flow according to the application profile comprise determining active queue management (AQM) scheduling for the packets of the packet flow.

9. The method as in claim 1, the one or more adjustments for the packet of the packet flow according to the application profile comprise determining a packet forwarding strategy for the packets of the packet flow.

10. The method as in claim 1, wherein the packet flow comprises a real-time audio flow, streaming flow, or control/command flows.

11. An apparatus, comprising:
one or more interfaces;
a processor coupled to the one or more interfaces and configured to execute one or more processes; and
a memory configured to store a process that is executable by the processor, the process when executed configured to:
 map, by an agent, a packet flow of the apparatus with a session of an application executed by the apparatus based on execution information about the application that is captured by an operating system of the apparatus, wherein the execution information is indicative of computing resources used by the application;
 determine, by the agent and based in part on mapping the packet flow of the apparatus with the session of the application, one or more adjustments for a packet of the packet flow according to an application profile;
 form, by the agent, an adjusted packet by applying the one or more adjustments to a packet of the packet flow, wherein the one or more adjustments indicate to a networking device how packets of the packet flow should be processed; and
 send, by the agent, the adjusted packet as part of the packet flow to an external destination via a network.

12. The apparatus as in claim 11, wherein the execution information about the application comprises information indicative of process groups, processes, threads, and socket membership associated with the application.

13. The apparatus as in claim 11, wherein mapping the packet flow of the apparatus with the session of the application executed by the apparatus is further based on network information associated with the apparatus.

14. The apparatus as in claim 13, wherein the network information comprises domain name system information, mappings between descriptive names and IP addresses, server name indications, or session description exchanges.

15. The apparatus as in claim 11, wherein mapping the packet flow of the apparatus with the session of the application executed by the apparatus comprises:
applying, by the agent, an inference engine to the execution information.

16. The apparatus as in claim 11, wherein the one or more adjustments for the packet of the packet flow according to the application profile cause the packets of the packet flow to be sent along a proxy forwarding path.

17. The apparatus as in claim 11, wherein the one or more adjustments for the packet of the packet flow according to the application profile cause the packets of the packet flow to be punted along a network path.

18. The apparatus as in claim 11, wherein the one or more adjustments for the packet of the packet flow according to the application profile comprise determining active queue management (AQM) scheduling for the packets of the packet flow.

19. The apparatus as in claim 11, the one or more adjustments for the packet of the packet flow according to the application profile comprise determining a packet forwarding strategy for the packets of the packet flow.

20. A tangible, non-transitory, computer-readable medium storing program instructions that cause a device to execute a process comprising:
 mapping, by an agent, a packet flow of the device with a session of an application executed by the device based on execution information about the application that is captured by an operating system of the device, wherein the execution information is indicative of computing resources used by the application;
 determining, based in part on mapping the packet flow of the device with the session of the application, one or more adjustments for a packet of the packet flow according to an application profile;
 forming an adjusted packet by applying the one or more adjustments to a packet of the packet flow, wherein the one or more adjustments indicate to a networking device how packets of the packet flow should be processed; and
 sending the adjusted packet as part of the packet flow to an external destination via a network.

* * * * *